United States Patent
Yamamoto et al.

(10) Patent No.: US 10,714,725 B2
(45) Date of Patent: Jul. 14, 2020

(54) SEPARATOR FOR NONAQUEOUS ELECTROLYTE SECONDARY BATTERY

(71) Applicant: TOYOTA JIDOSHA KABUSHIKI KAISHA, Toyota-shi, Aichi-ken (JP)

(72) Inventors: Yuji Yamamoto, Toyota (JP); Ryuta Sugiura, Toyohashi (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 131 days.

(21) Appl. No.: 16/117,097

(22) Filed: Aug. 30, 2018

(65) Prior Publication Data

US 2019/0097199 A1     Mar. 28, 2019

(30) Foreign Application Priority Data

Sep. 22, 2017    (JP) .................................. 2017-181963

(51) Int. Cl.
*H01M 4/04*     (2006.01)
*H01M 2/16*     (2006.01)
*H01M 10/0525*     (2010.01)

(52) U.S. Cl.
CPC ....... *H01M 2/1686* (2013.01); *H01M 2/1646* (2013.01); *H01M 10/0525* (2013.01)

(58) Field of Classification Search
CPC ...................................................... H01M 4/02
See application file for complete search history.

(56) References Cited

U.S. PATENT DOCUMENTS 5,830,603 A * 11/1998 Oka .................. H01M 2/145
                                                                429/249
2017/0117523 A1   4/2017 Kim et al.

FOREIGN PATENT DOCUMENTS

| JP | 06-076807 A | 3/1994 |
| JP | 08-050890 A | 2/1996 |
| JP | 2000-138050 A | 5/2000 |
| JP | 2009-146756 A | 7/2009 |
| JP | 2011-159434 A | 8/2011 |
| JP | 2017-084779 A | 5/2017 |
| WO | 2016/002637 A1 | 1/2016 |

* cited by examiner

*Primary Examiner* — Jacob B Marks
(74) *Attorney, Agent, or Firm* — Sughrue Mion, PLLC

(57) ABSTRACT

Provided is a separator that is used in a nonaqueous electrolyte secondary battery, and that exhibits high impregnation ability with respect to a nonaqueous electrolyte solution. The separator for a nonaqueous electrolyte secondary battery disclosed herein is provided with: a porous substrate; a first coat layer formed on a pair of main surfaces and on an inner surface of the porous substrate; and a second coat layer formed on the first coat layer, at least on one main surface of the porous substrate. The first coat layer has higher hydrophilicity than the porous substrate. The second coat layer has higher hydrophobicity than the porous substrate. The hydrophilicity of an inner surface of the separator for a nonaqueous electrolyte secondary battery is higher than the hydrophilicity of the second coat layer, in a central region of the separator for a nonaqueous electrolyte secondary battery in the thickness direction thereof.

7 Claims, 3 Drawing Sheets

SEPARATOR FOR NONAQUEOUS ELECTROLYTE SECONDARY BATTERY

BACKGROUND OF THE INVENTION

1. Field of the Invention

The present teaching relates to a separator for a nonaqueous electrolyte secondary battery. The present application claims priority based on Japanese Patent Application No. 2017-181963, filed on Sep. 22, 2017, the entire contents of which are incorporated herein by reference.

2. Description of the Related Art

In recent years, nonaqueous electrolyte secondary batteries such as lithium ion secondary batteries have come to being suitably used as portable power sources in personal computers, mobile terminals and the like, and as power sources for vehicle drive in electric vehicles (EV), hybrid vehicles (HV) and plug-in hybrid vehicles (PHV).

Nonaqueous electrolyte secondary batteries typically have a configuration in which an electrode body having a positive electrode, a negative electrode and a separator that insulates the positive and negative electrodes, and a non-aqueous electrolyte solution, are accommodated in a battery case. A porous sheet is ordinarily used as the separator.

Controlling the hydrophilicity and hydrophobicity of the separator is a known technique aimed at enhancing battery characteristics (see for instance Japanese Patent Application Publication No. H06-076807, Japanese Patent Application Publication No. 2000-138050, Japanese Patent Application Publication No. 2011-159434, Japanese Patent Application Publication No. 2017-084779, Japanese Patent Application Publication No. 2009-146756, WO 2016/002637 and Japanese Patent Application Publication No. H08-050890).

Among the foregoing, Japanese Patent Application Publication No. H06-076807, Japanese Patent Application Publication No. 2000-138050 and Japanese Patent Application Publication No. 2011-159434 disclose the feature of intermixing hydrophilic and hydrophobic portions in the separator.

Japanese Patent Application Publication No. 2017-084779 discloses the feature of providing a heat-resistant inorganic layer at least on one main surface and the inner surface of a separator, and forming a hydrophobic layer on the heat-resistant inorganic layer.

SUMMARY OF THE INVENTION

However, intensive research conducted by the inventors has revealed that there remains room for improvement as regards the impregnation ability of the nonaqueous electrolyte solution into the separator in a case where conventional separator is used in the nonaqueous electrolyte secondary battery.

It is therefore an object of the present teaching to provide a separator that is used in a nonaqueous electrolyte secondary battery, and that exhibits high impregnation ability with respect to a nonaqueous electrolyte solution.

The separator for a nonaqueous electrolyte secondary battery disclosed herein is provided with: a porous substrate; a first coat layer formed on a pair of main surfaces and on an inner surface of the porous substrate; and a second coat layer formed on the first coat layer, at least on one main surface of the porous substrate. The first coat layer has higher hydrophilicity than the porous substrate. The second coat layer has higher hydrophobicity than the porous substrate. The hydrophilicity of an inner surface of the separator for a nonaqueous electrolyte secondary battery is higher than the hydrophilicity of the second coat layer, in a central region of the separator for a nonaqueous electrolyte secondary battery in the thickness direction thereof.

By virtue of such a configuration, nonaqueous electrolyte solution flowing into an inner region of the separator is held readily by the first coat layer of high hydrophilicity, at the inner region of the separator, while the inflowing nonaqueous electrolyte solution is driven readily to the inner region of the separator and is allowed to be hard to flow out of the separator by the second coat layer of high hydrophobicity, at the surface portion. Thanks to such a configuration a separator is therefore provided that is used in nonaqueous electrolyte secondary batteries and having high impregnation ability with respect to a nonaqueous electrolyte solution.

In a desired implementation of the separator for a nonaqueous electrolyte secondary battery disclosed herein, the first coat layer contains at least one compound selected from the group consisting of $Al(OH)_3$, $AlO_2H$ and $Al_2O_3$.

Such a configuration allows imparting particularly high hydrophilicity to the first coat layer, and the impregnation ability of the nonaqueous electrolyte solution into the separator for a nonaqueous electrolyte secondary battery is very high.

In a desired implementation of the separator for a nonaqueous electrolyte secondary battery disclosed herein, the first coat layer contains $Al(OH)_3$.

Such a configuration affords very high impregnation ability of the nonaqueous electrolyte solution into the separator for a nonaqueous electrolyte secondary battery.

In a desired implementation of the separator for a nonaqueous electrolyte secondary battery disclosed herein, the second coat layer is formed on the first coat layer, on both main surfaces of the porous substrate.

The impregnation ability of the nonaqueous electrolyte solution into the separator for a nonaqueous electrolyte secondary battery is yet higher by virtue of such a configuration.

In a desired implementation of the separator for a nonaqueous electrolyte secondary battery disclosed herein, the second coat layer contains at least one compound selected from the group consisting of $Nb_2O_5$, $Y_2O_3$ and $CeO_2$.

Such a configuration allows imparting particularly high hydrophobicity to the second coat layer, and the impregnation ability of the nonaqueous electrolyte solution into the separator for a nonaqueous electrolyte secondary battery is very high.

In a desired implementation of the separator for a nonaqueous electrolyte secondary battery disclosed herein, the second coat layer contains $Nb_2O_5$.

Such a configuration affords very high impregnation ability of the nonaqueous electrolyte solution into the separator for a nonaqueous electrolyte secondary battery.

In a desired implementation of the separator for a nonaqueous electrolyte secondary battery disclosed herein, the separator for a nonaqueous electrolyte secondary battery is used for lithium ion secondary batteries.

Such a configuration affords a remarkably high effect of enhancing the impregnation ability of a nonaqueous electrolyte solution.

DESCRIPTION OF THE PREFERRED EMBODIMENT

Figure 1:
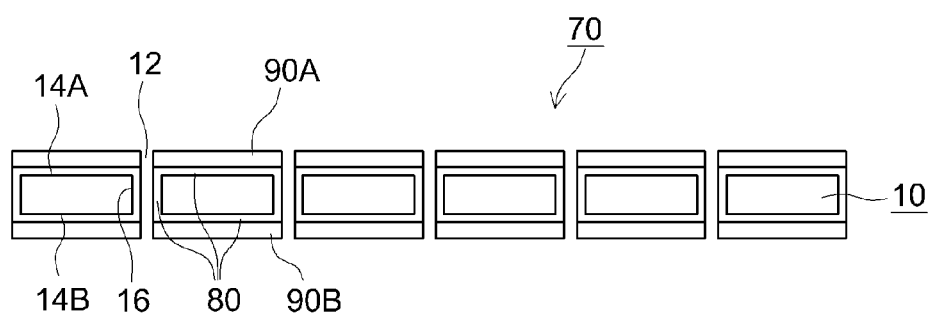
FIG. 1 is a cross-sectional diagram illustrating schematically a separator for a nonaqueous electrolyte secondary battery according to an embodiment of the present teaching.

An embodiment of the present teaching will be explained below with reference to accompanying drawings. Any features other than the matter specifically set forth in the present specification and that may be necessary for carrying out the present teaching (for instance, the ordinary configuration and production process of the separator for a nonaqueous electrolyte secondary battery and not being characterizing features of the present teaching) can be regarded as instances of design matter, for a person skilled in the art, based on conventional techniques in the relevant technical field. The present teaching can be realized on the basis of the disclosure of the present specification and common technical knowledge in the relevant technical field. In the drawings below, members and portions that elicit identical effects are denoted with identical reference symbols. The dimensional relationships (length, width, thickness and so forth) in the figures do not necessarily reflect actual dimensional relationships.

In the present specification the term "secondary battery" denotes an electric storage device in general that is capable of being charged and discharged repeatedly, and encompasses so-called storage batteries such as lithium ion secondary batteries and electric storage elements such as electrical double layer capacitors.

Figure 2:
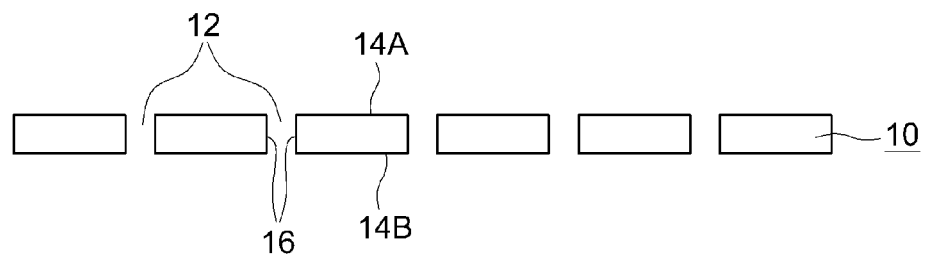
FIG. 2 is a cross-sectional diagram illustrating schematically a porous substrate used in a separator for a nonaqueous electrolyte secondary battery according to an embodiment of the present teaching.

FIG. 1 is a cross-sectional diagram illustrating schematically a separator for a nonaqueous electrolyte secondary battery according to the present embodiment. FIG. 2 is a cross-sectional diagram illustrating schematically a porous substrate used in a separator for a nonaqueous electrolyte secondary battery according to an embodiment of the present teaching.

As illustrated in the figure, a separator 70 for a nonaqueous electrolyte secondary battery is provided with a porous substrate 10.

The porous substrate 10 has multiple through-holes 12. The porous substrate 10 has a pair of main surfaces 14A, 14B. The through-holes 12 communicate the main surface 14A and the main surface 14B of the porous substrate, in such a way as to enable a nonaqueous electrolyte solution to move through the porous substrate 10. The porous substrate 10 is porous and has the through-holes 12, and accordingly has an inner surface 16.

In the example of the figure, the through-holes 12 are formed perpendicularly to the pair of main surfaces 14A, 14B, but the shape of the through-holes 12 is not limited thereto so long as the through-holes 12 communicate the main surface 14A with the main surface 14B of the porous substrate. For instance the through-holes 12 may be linked to each other, thereby forming a network.

As the porous substrate 10, there can be used for instance a porous sheet or film made up of a resin such as a polyolefin, a polyester, cellulose, or a polyamide. The porous substrate 10 is desirably a porous sheet or film made of a polyolefin, such as polyethylene (PE) or polypropylene (PP). The porous sheet or film may have a single-layer structure or may have a multilayer structure of two or more layers (for instance a three-layer structure in which a PP layer is laid up on both faces of a PE layer).

The thickness of the porous substrate 10 is not particularly limited so long as the positive electrode and the negative electrode of the nonaqueous electrolyte secondary battery can be insulated from each other, but is for instance no less than 10 μm and no more than 40 μm, desirably no less than 15 μm and no more than 30 μm.

As illustrated in FIG. 1, the separator 70 is provided with a first coat layer 80 formed on the pair of main surfaces 14A, 14B and on the inner surface 16 of the porous substrate 10.

The first coat layer 80 has higher hydrophilicity than the porous substrate 10.

The method for forming the first coat layer 80 is not particularly limited, and the first coat layer 80 may be formed by subjecting the porous substrate 10 to a hydrophilicity-imparting treatment for instance by dipping. Specifically, for instance the first coat layer 80 can be formed by dipping the porous substrate 10 in a coating solution containing a compound having higher hydrophilicity than the porous substrate 10, and thereafter pulling the porous substrate 10 up from the coating solution, followed by drying. In a dipping method, the coating solution becomes attached to the main surfaces 14A. 14B and the inner surface 16 of the porous substrate 10, and accordingly it becomes possible to form the first coat layer 80 efficiently on the pair of main surfaces 14A, 14B and on the inner surface 16 of the porous substrate 10.

The coating solution contains a solvent or a dispersion medium, and may further contain a binder component (for example, a fluoropolymer such as a polyvinylidene fluoride, a rubber-binder, an acrylic-based binder, or polyvinyl alcohol), a viscosity adjuster and the like.

Accordingly, the first coat layer 80 desirably contains a compound having higher hydrophilicity than the porous substrate 10. As a result, it becomes possible to more easily render the hydrophilicity of the first coat layer 80 higher than that of the porous substrate 10. The above compound is desirably at least one compound selected from the group consisting of $Al(OH)_3$, $AlO_2H$ and $Al_2O_3$, since these allow imparting particularly high hydrophilicity to the first coat layer 80, with a very significant increase in the impregnation ability of the nonaqueous electrolyte solution into the separator 70. The above compound is more desirably $Al(OH)_3$, since in that case the impregnation ability of the nonaqueous electrolyte solution into the separator 70 is particularly high.

The first coat layer 80 may contain for instance the above binder component and a viscosity adjuster.

The first coat layer 80 may be formed on the entire surface of the porous substrate 10. Accordingly, the first coat layer 80 may be formed also on the side faces of the porous substrate 10.

The thickness of the first coat layer 80 is not particularly limited, so long as the through-holes 12 of the porous substrate 10 are not plugged and the nonaqueous electrolyte solution can pass therethrough. The thickness of the first coat layer 80 is for instance no less than 1 nm and no more than 50 nm, desirably no less than 2 nm and no more than 20 nm.

As illustrated in FIG. 1, the separator 70 is provided with a second coat layer 90A formed on the first coat layer 80, on the main surface 14A of the porous substrate 10, and with a second coat layer 90B formed on the first coat layer 80, on the main surface 14B of the porous substrate 10.

The second coat layers 90A, 90B have higher hydrophobicity than the porous substrate 10.

In the example of the figure, the second coat layers 90A, 90B are formed on the pair of main surfaces 14A, 14B of the porous substrate 10, respectively. However, a configuration may be adopted wherein the second coat layer 90B is not formed on the main surface 14B of the porous substrate, and the second coat layer 90A is formed only on the main surface 14A of the porous substrate. Conversely, a configuration may be adopted in which the second coat layer 90A is not formed on the main surface 14A of the porous substrate, and the second coat layer 90B is formed only on the main surface 14B of the porous substrate.

The second coat layers 90A, 90B are desirably formed on the first coat layer 80, on both main surfaces 14A. 14B of the porous substrate 10, respectively, since in that case impregnation ability of the nonaqueous electrolyte solution is yet higher.

In the example of the figure, the main surface 14A side and the second coat layer 90A side of the porous substrate 10 denote the positive electrode side, and the main surface 14B side and the second coat layer 90B side of the porous substrate denote the negative electrode side.

The method for forming the second coat layers 90A. 90B is not particularly limited, and the second coat layers 90A, 90B can be formed for instance by performing a hydrophobicity-imparting treatment on the surface of the porous substrate 10 having the first coat layer 80 formed thereon. Specifically, for instance, the second coat layers 90A, 90B can be formed by applying a coating solution containing a compound of higher hydrophobicity than that of the porous substrate 10, in accordance with a known coating method (for instance using a gravure coater, a bar coater or a die coater), onto the surface of the porous substrate 10 having the first coat layer 80 formed thereon, followed by drying.

In the hydrophobicity-imparting treatment there is selected as appropriate a method in which the components that make up the second coat layers 90A, 90B are unlikely to flow (and desirably do not flow) into the through-holes 12 of the porous substrate 10. Accordingly, a method is desired in which the coating solution is applied onto the first coat layer 80 that is positioned on the main surface of the porous substrate 10.

The coating solution contains a solvent or a dispersion medium, and may further contain a binder component (for example, a fluoropolymer such as a polyvinylidene fluoride, a rubber-binder, an acrylic-based binder, or polyvinyl alcohol), a viscosity adjuster and the like.

Accordingly, the second coat layers 90A, 90B contain desirably a compound of higher hydrophobicity than that of the porous substrate 10. As a result, it becomes possible to more easily render the hydrophobicity of the second coat layers 90A, 90B higher than that of the porous substrate 10. The above compound is desirably at least one compound selected from the group consisting of $Nb_2O_5$, $Y_2O_3$ and $CeO_2$, since these allow imparting particularly high hydrophobicity to the second coat layers 90A, 90B, with a very significant increase in the impregnation ability of the nonaqueous electrolyte solution into the separator 70. The above compound is more desirably $Nb_2O_5$, since in that case the impregnation ability of the nonaqueous electrolyte solution into the separator 70 is particularly high.

The second coat layers 90A, 90B may contain for instance the above binder component and a viscosity adjuster.

The thickness of the second coat layers 90A, 90B is not particularly limited. The thickness of the second coat layers 90A, 90B is for instance no less than 1 nm and no more than 50 nm, and desirably no less than 2 nm and no more than 20 nm.

The degree of high/low hydrophilicity and the degree of high/low hydrophobicity in the present specification can be evaluated in accordance with known methods (for instance by contact angle measurement).

In the separator 70 according to the present embodiment, as described above, the second coat layers 90A, 90B are formed on the main surfaces 14A, 14B of the porous substrate 10.

Meanwhile, the inner surface 16 of the porous substrate 10 is covered with the first coat layer 80 having high hydrophilicity, and substantially no second coat layer is formed on the first coat layer 80 on the inner surface 16 of the porous substrate 10 (it should be noted that the phrase "substantially no second coat layer is formed on the first coat layer 80 on the inner surface 16 of the porous substrate 10" is a concept that permits a case where the second coat layer becomes formed in the vicinity of the openings of the through-holes 12 due to slight intrusion of a component that forms the second coat layer into the through-holes 12 of the porous substrate 10, and a case where the second coat layer is formed in a very small amount on the inner surface of the porous substrate 10, to an extent that hydrophilicity is not impaired, for instance for reasons of manufacturability). That is, the first coat layer 80 is exposed at the inner surface of the separator 70.

It is accordingly a characterizing feature of the separator 70 according to the present embodiment that in the central region of the separator 70 in the thickness direction thereof, the hydrophilicity of the inner surface of the separator 70 is higher than the hydrophilicity of the second coat layers 90A, 90B.

(It should be noted that for the hydrophilicity of the inner surface of the separator 70 and the hydrophilicity of the second coat layers 90A, 90B, there are respectively compared the hydrophilicity of the entire inner surface of the separator 70 and the hydrophilicity of the entire second coat layers 90A, 90B.)

In the present specification, the central region of the separator 70 in the thickness direction thereof denotes a region centered on the center of the separator 70 in the thickness direction thereof, the region having a dimension of 50%, desirably 75% and more desirably 90%, of the thickness of the separator 70 in the thickness direction thereof.

As described above, in the separator 70 according to the present embodiment, the inner surface 16 of the porous substrate 10 is covered by the first coat layer 80 of high hydrophilicity, and accordingly the hydrophilicity of an inner region of the separator 70 is higher than that of the porous substrate 10 that makes up the separator 70. Meanwhile, the second coat layers 90A, 90B of high hydrophobicity are formed on the main surfaces 14A, 14B of the porous substrate, and accordingly the hydrophobicity of the surface layer portion of the separator 70 is higher than that of the porous substrate 10 that makes up the separator 70 (the hydrophilicity of the surface layer portion of the separator 70 is lower than that of the porous substrate 10 that makes up the separator 70).

As a result, nonaqueous electrolyte solution flowing into the inner region of the separator 70 is held readily by the first coat layer 80 of high hydrophilicity, while the inflowing nonaqueous electrolyte solution is driven readily to the inner region of the separator 70 and is allowed to be hard to flow out of the separator 70 by the second coat layers 90A, 90B of high hydrophobicity. As a result, the nonaqueous electrolyte secondary battery that utilizes the separator 70 according to the present embodiment exhibits very high impregnation ability of the nonaqueous electrolyte solution into the separator 70, as compared with a nonaqueous electrolyte secondary battery that utilizes a conventional separator.

This very high impregnation ability of the nonaqueous electrolyte solution into the separator is advantageous in terms of production, since it becomes possible to shorten the time necessary for impregnation of an electrode body with the nonaqueous electrolyte solution during production of the nonaqueous electrolyte secondary battery. Further, the very high impregnation ability of the nonaqueous electrolyte solution into the separator is likewise advantageous in terms of battery characteristics, since it becomes possible to suppress excessive outflow of the nonaqueous electrolyte solution from the electrode body during charge and discharge.

The separator 70 according to the present embodiment is used in nonaqueous electrolyte secondary batteries, and affords a remarkably high effect of enhancing the impregnation ability of a nonaqueous electrolyte solution. Accordingly, the separator is desirably used in lithium ion secondary batteries.

A configuration example of a lithium ion secondary battery as the nonaqueous electrolyte secondary battery that utilizes the separator 70 will be explained next.

Figure 3:
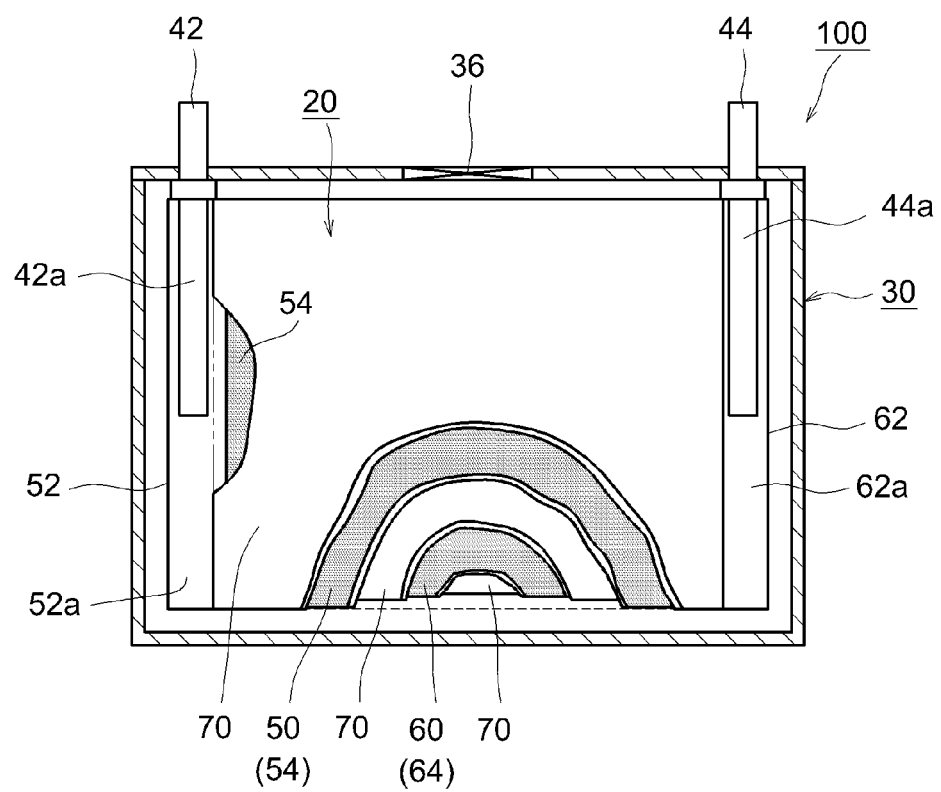
FIG. 3 is a cross-sectional diagram illustrating schematically the internal structure of a lithium ion secondary battery that utilizes a separator for a nonaqueous electrolyte secondary battery according to an embodiment of the present teaching.
Figure 4:
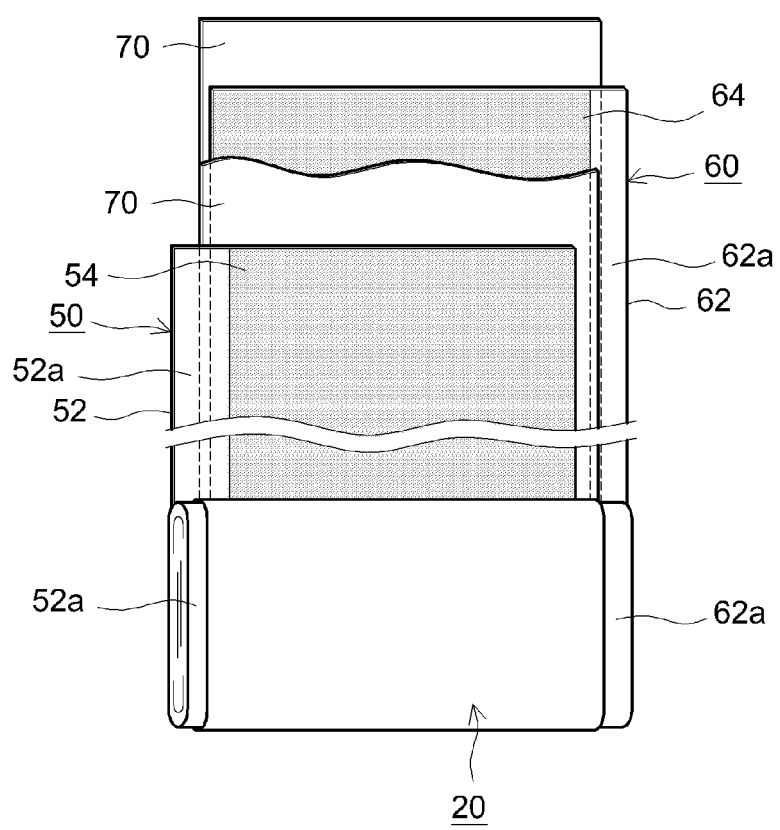
FIG. 4 is a cross-sectional diagram illustrating schematically the configuration of a wound electrode body of a lithium ion secondary battery that utilizes a separator for a nonaqueous electrolyte secondary battery according to an embodiment of the present teaching.

FIG. 3 is a cross-sectional diagram illustrating schematically the internal structure of a lithium ion secondary battery that utilizes the separator 70. FIG. 4 is a schematic diagram illustrating the configuration of a wound electrode body of the lithium ion secondary battery that utilizes the separator 70.

A lithium ion secondary battery 100 illustrated in FIG. 3 is a sealed-type lithium ion secondary battery 100 constructed in such a manner that a flat wound electrode body 20 and a nonaqueous electrolyte solution (not shown) are accommodated in a flat square battery case (i.e. outer container) 30. The battery case 30 is provided with a positive electrode terminal 42 and a negative electrode terminal 44 for external connection, and with a thin-walled safety valve 36 configured so as to release an internal pressure in the battery case 30 when the internal pressure rises to or above a predetermined level. An injection port (not shown) for injecting the nonaqueous electrolyte solution is provided also in the battery case 30. The positive electrode terminal 42 is electrically connected to a positive electrode collector plate 42a. The negative electrode terminal 44 is electrically connected to a negative electrode collector plate 44a. For instance a lightweight metallic material of good thermal conductivity, such as aluminum, is used as the material of the battery case 30.

As illustrated in FIG. 3 and FIG. 4, the wound electrode body 20 is of a form that results from laminating a positive electrode sheet 50 in which a positive electrode active material layer 54 is formed along the longitudinal direction on one or both faces (herein both faces) of an elongated positive electrode collector 52, and a negative electrode sheet 60 in which a negative electrode active material layer 64 is formed along the longitudinal direction on one face or both faces (herein both faces) of an elongated negative electrode collector 62, with two elongated separator sheets 70 interposed in between, and winding then the resulting stack in the longitudinal direction. The positive electrode collector plate 42a and the negative electrode collector plate 44a are respectively joined to a positive electrode active material layer non-formation portion 52a (i.e. exposed portion of the positive electrode collector 52 at which the positive electrode active material layer 54 is not formed) and a negative electrode active material layer non-formation portion 62a (i.e. exposed portion of the negative electrode collector 62 at which the negative electrode active material layer 64 is not formed) that are formed so as to protrude outward from both edges of the wound electrode body 20 in the winding axis direction thereof (sheet width direction perpendicular to the longitudinal direction).

Sheets similar to those used in conventional lithium ion secondary batteries can be used, without particular limitations, as the positive electrode sheet 50 and the negative electrode sheet 60. One typical implementation is described below.

Examples of the positive electrode collector 52 that makes up the positive electrode sheet 50 include for instance aluminum foil. Examples of the positive electrode active material contained in the positive electrode active material layer 54 include for instance lithium-transition metal oxides (for example $LiNi_{1/3}Co_{1/3}Mn_{1/3}O_2$, $LiNiO_2$, $LiCoO_2$, $LiFeO_2$, $LiMn_2O_4$, $LiNi_{0.5}Mn_{1.5}O_4$ and the like) and lithium-transition metal phosphate compounds (for example $LiFePO_4$). The positive electrode active material layer 54 can contain components other than the active material, for instance a conductive material and a binder. As the conductive material there can be suitably used for instance carbon black such as acetylene black (AB) or other carbon materials (for example graphite or the like). For instance polyvinylidene fluoride (PVDF) or the like can be used as the binder.

For instance a copper foil or the like can be used as the negative electrode collector 62 that makes up the negative electrode sheet 60. A carbon material such as graphite, hard carbon, or soft carbon can be used as the negative electrode active material contained in the negative electrode active material layer 64. The negative electrode active material layer 64 can contain components other than the active material, for instance a binder, a thickener or the like. For instance styrene butadiene rubber (SBR) or the like can be used as the binder. For instance carboxymethyl cellulose (CMC) or the like can be used as the thickener.

The separator 70 is as described above.

A solution similar to those of conventional lithium ion secondary batteries can be used as the nonaqueous electrolyte solution. A solution can be typically used that contains a supporting salt in an organic solvent (nonaqueous solvent). As the nonaqueous solvent there can be used, without particular limitations, various types of organic solvent, for instance carbonates, ethers, esters, nitriles, sulfones, lactones and the like that are utilized in electrolyte solutions of ordinary lithium ion secondary batteries. Concrete examples include for instance ethylene carbonate (EC), propylene carbonate (PC), diethyl carbonate (DEC), dimethyl carbonate (DMC), ethyl methyl carbonate (EMC), monofluoroethylene carbonate (MFEC), difluoroethylene carbonate (DFEC), monofluoromethyl difluoromethyl carbonate (F-DMC), trifluorodimethyl carbonate (TFDMC) and the like. Such nonaqueous solvents can be used singly or in appropriate combination of two or more types. For instance a lithium salt such as $LiPF_6$, $LiBF_4$, or $LiClO_4$ (desirably $LiPF_6$) can be used as the supporting salt. The concentration of the supporting salt is desirably 0.7 mol/L to 1.3 mol/L.

So long as the effect of the present teaching is not significantly impaired thereby, the above nonaqueous electrolyte solution can contain various additives, for instance gas generating agents such as biphenyl (BP), or cyclohexyl benzene (CHB); film-forming agents such as oxalato complex compounds containing boron atoms and/or phosphorus atoms, or vinylene carbonate (VC); dispersing agents; and thickeners.

The lithium ion secondary battery 100 configured as described above can be used in various types of application. Examples of suitable applications include drive power sources installed in vehicles such as electric vehicles (EV), hybrid vehicles (HV), and plug-in hybrid vehicles (PHV). The lithium ion secondary battery 100 can also be used in the form of a battery pack in which a plurality of lithium ion secondary batteries 100 is connected in series and/or in parallel.

A square lithium ion secondary battery 100 provided with a flat wound electrode body 20 has been explained as an example. However, the lithium ion secondary battery can be configured also in the form of a lithium ion secondary battery provided with a stacked electrode body. The lithium ion secondary battery can be configured in the form of a cylindrical lithium ion secondary battery.

A nonaqueous electrolyte secondary battery other than a lithium ion secondary battery can be likewise be configured using the separator 70 in accordance with known methods.

Examples pertaining to the present teaching will be explained next, but the present teaching is not intended to be limited to the examples.

Production of Separators A1 to A8 and B1 to B8

A porous sheet of a PE single layer was prepared as the porous substrate.

In the case where a coat layer A was formed, the porous sheet was dipped in a coating solution containing the respective compound given in Table 1, was pulled up, and was then dried. As the coating solution, there were used solutions containing the compounds given in Table 1, polyvinylidene fluoride and N-methyl pyrrolidone at a mass ratio of 15:20:65. As a result of this process, a respective coat layer A became formed on the entirety of the porous sheet (outer surface and inner surface). The thickness of the coat layer A was 5 nm.

In the case where the coat layer B1 and/or the coat layer B2 were formed, respective coating solutions containing the compounds given in Table 1 were applied using a gravure coater, on the surface of the porous sheet, followed by drying. As the coating solution, there were used solutions containing the compounds given in Table 1, polyvinylidene fluoride and N-methyl pyrrolidone at a mass ratio of 15:20:65. As a result of this process, a coat layer B1 and/or B2 was/were formed only on the main surface of the separator. The thickness of each of the coat layers B1 and B2 thus formed was 5 nm. The coat layer B1 was formed to lie on the positive electrode side of the separator of the constructed lithium ion secondary battery, and the coat layer B2 was formed to lie on the negative electrode side of the separator of the constructed lithium ion secondary battery.

In the case where the coat layer A plus the coat layer B1 and/or the coat layer B2 were formed, the coat layer A was formed first and the coat layer B1 and/or coat layer B2 was formed next.

Herein $Al(OH)_3$, $AlO_2H$ and $Al_2O_3$ are compounds having higher hydrophilicity than that of the porous sheet, and $Nb_2O_5$, $Y_2O_3$ and $CeO_2$ are compounds having higher hydrophobicity than that of the porous sheet.

Separators A1 to A8 and B2 to B8 having undergone a hydrophilicity-imparting treatment and/or a hydrophobicity-imparting treatment were thus obtained. Herein a PE single layer porous sheet was used, as it was, as the separator B1.

Production of Lithium Ion Secondary Battery

A paste for forming a positive electrode active material layer was prepared by mixing $LiNi_{1/3}Co_{1/3}Mn_{1/3}O_2$ (LNCM) as a positive electrode active material powder, AB as a conductive material and PVDF as a binder, with N-methyl pyrrolidone (NMP), at a mass ratio of LNCM:AB:PVDF=94:3:3. The paste was applied, in the form of a band, onto both faces of a 15 μm thick aluminum foil, and the whole was dried and pressed, to produce thereby a positive electrode.

A paste for forming a negative electrode active material layer was prepared by mixing spheroidized graphite (C) as a negative electrode active material, CMC as a thickener and SBR as a binder, with deionized water, at a mass ratio of C:CMC:SBR=98:1:1. The paste was applied, in the form of a band, onto both faces of a 10 μm thick copper foil, and the whole was dried and pressed, to produce thereby a negative electrode.

The positive electrode, negative electrode and separator thus produced were laid up with the separator interposed between the positive and the negative electrodes, and the whole was wound, to yield a wound electrode body.

The produced wound electrode body was accommodated in a battery case. Next, a nonaqueous electrolyte solution was injected through an opening of the battery case under a temperature environment at 20° C. to produce a square lithium ion secondary battery having a capacity of 5 Ah. As the nonaqueous electrolyte solution, there was used an electrolyte resulting from dissolving $LiPF_6$ as a supporting salt, to a concentration of 1.0 mol/L, in a mixed solvent that contained ethylene carbonate (EC), dimethyl carbonate (DMC) and ethyl methyl carbonate (EMC) at a volume ratio of EC:DMC:EMC=3:4:3.

Evaluation of Contact Angle

The nonaqueous electrolyte solution used for producing the above lithium ion secondary batteries was dripped onto the produced separator, and the contact angle (°) was measured. The results are given in Table 1.

Measurement of Impregnation Time

Impregnation time was determined, for each lithium ion secondary battery, as the time elapsed until the wound electrode body was impregnated with 60 mass % of the injected nonaqueous electrolyte solution.

Specifically, the weight of the wound electrode body was measured before injection of the nonaqueous electrolyte solution into the battery case of each lithium ion secondary battery. Next, the nonaqueous electrolyte solution was injected into the battery case of the lithium ion secondary battery under a temperature environment at 20° C. The wound electrode body was impregnated with the nonaqueous electrolyte solution, and thereafter the wound electrode body was pulled up from the nonaqueous electrolyte solution. The weight of the wound electrode body was measured once more. The difference between the weights of the wound electrode body before and after impregnation with the nonaqueous electrolyte solution was calculated, to thereby determine the weight (impregnation amount) of the nonaqueous electrolyte solution having become impregnated into the wound electrode body. A numerical percentage resulting from dividing this impregnation amount by the injection amount of the nonaqueous electrolyte solution was taken as an impregnation proportion (%), and the lapse of time up to an impregnation proportion of 60% was determined as the impregnation time (h). The results are given in Table 1.

TABLE 1

| Separator | Coat layer A | Coat layer B1 | Coat layer B2 | Contact angle (°) | Impregnation time (h) |
|---|---|---|---|---|---|
| A1 | $Al_2O_3$ | $Nb_2O_5$ | — | 20 | 7 |
| A2 | $Al_2O_3$ | — | $Nb_2O_5$ | 20 | 7 |
| A3 | $Al_2O_3$ | $Y_2O_3$ | — | 30 | 10 |
| A4 | $Al_2O_3$ | $CeO_2$ | — | 25 | 9 |
| A5 | $AlO_2H$ | $Nb_2O_5$ | — | 10 | 3 |
| A6 | $Al(OH)_3$ | $Nb_2O_5$ | — | 5 | 2 |
| A7 | $AlO_2H$—$Al(OH)_3$ | $Nb_2O_5$ | — | 7 | 3 |
| A8 | $Al_2O_3$ | $Nb_2O_5$ | $Nb_2O_5$ | 20 | 5 |
| B1 | — | — | — | 60 | 24 |
| B2 | $Al_2O_3$ | — | — | 30 | 18 |
| B3 | $Nb_2O_5$ | — | — | 80 | 30 |
| B4 | — | $Nb_2O_5$ | — | 70 | 26 |
| B5 | — | — | $Nb_2O_5$ | 70 | 26 |
| B6 | — | $Nb_2O_5$ | $Nb_2O_5$ | 70 | 28 |
| B7 | $Nb_2O_5$ | $Al_2O_3$ | — | 60 | 24 |
| B8 | $Al_2O_3$—$Nb_2O_5$ | — | — | 60 | 24 |

The separator B1 is a separator having no coat layer provided thereon (i.e. untreated separator).

The impregnation time in separator B2 provided with the hydrophilic coat layer A was shorter than that in the untreated separator B1. This arises from the fact that the hydrophilicity of the entire separator B2 (main surface and inner surface) is high, and the retentivity of the nonaqueous electrolyte solution is thus high. However the reduced impregnation time was short.

Impregnation time in separator B3 provided with the hydrophobic coat layer A was somewhat longer. This arises from the fact that the hydrophobicity in the entire separator B3 (main surface and inner surface) is high, and retentivity of the nonaqueous electrolyte solution is thus low.

The impregnation times in separators B4 to B6 provided with the hydrophobic coat layer B1 and/or hydrophobic coat layer B2 were somewhat longer. This arises from the high hydrophobicity of the surface of the separators B4 to B6.

The impregnation time in separator B7 provided with the hydrophobic coat layer A and the hydrophilic coat layer B1 exhibited no change. That is because although the main surface of the separator B7 is hydrophilic, the inner surface of the separator B7 is hydrophobic, and accordingly the retentivity of the nonaqueous electrolyte solution does not increase.

Impregnation time did not change in separator B8 provided with the coat layer A that contained both a hydrophobic compound and a hydrophilic compound. That is because the hydrophobic portion and the hydrophilic portion are intermixed in the entire separator B8 (main surface and an inner surface), and accordingly the retentivity of the nonaqueous electrolyte solution does not increase.

By contrast, the impregnation times were significantly shortened in separators A1 to A8 provided with the hydrophilic coat layer A and the hydrophobic coat layer B1 and/or B2. That is because hydrophilicity inside the separator is high as well as the hydrophobicity of the separator surface is high, and therefore, the nonaqueous electrolyte solution is readily driven into the separator, is readily held inside the separator, and does not readily flow out of the separator.

A comparison of separators A1 to A8 reveals that impregnation time can be further shortened by providing both the hydrophobic coat layers B1 and B2. The impregnation ability-enhancing effect of the hydrophilic compounds contained in the coat layer A was high, in the order $Al(OH)_3 > AlO_2H > Al_2O_3$. This matches the order of hydrophilicity of the compounds. The impregnation ability-enhancing effect of the hydrophobic compounds contained in the coat layers B1 and B2 was high, in the order $Nb_2O_5 > CeO_2 > Y_2O_3$. This matches the order of hydrophobicity of the compounds.

From all the above, it is understood that the separator for a nonaqueous electrolyte secondary battery according to the present embodiment has high impregnation ability with respect to a nonaqueous electrolyte solution.

Concrete examples of the present teaching have been explained above in detail, but the concrete examples are illustrative in nature and are not meant to limit the scope of the claims in any way. The technology set forth in the claims includes variations and modifications of the concrete examples illustrated above.

What is claimed is:

1. A separator for a nonaqueous electrolyte secondary battery, comprising:
   a porous substrate;
   a first coat layer formed on a pair of main surfaces and on an inner surface of the porous substrate; and
   a second coat layer formed on the first coat layer, at least on one main surface of the porous substrate,
   wherein the first coat layer has higher hydrophilicity than the porous substrate,
   the second coat layer has higher hydrophobicity than the porous substrate, and
   the hydrophilicity of an inner surface of the separator for a nonaqueous electrolyte secondary battery is higher than the hydrophilicity of the second coat layer, in a central region of the separator for a nonaqueous electrolyte secondary battery in the thickness direction thereof.

2. The separator for a nonaqueous electrolyte secondary battery according to claim 1, wherein the first coat layer contains at least one compound selected from the group consisting of $Al(OH)_3$, $AlO_2H$ and $Al_2O_3$.

3. The separator for a nonaqueous electrolyte secondary battery according to claim 1, wherein the first coat layer contains $Al(OH)_3$.

4. The separator for a nonaqueous electrolyte secondary battery according to claim 1, wherein the second coat layer is formed on the first coat layer, on both main surfaces of the porous substrate.

5. The separator for a nonaqueous electrolyte secondary battery according to claim 1, wherein the second coat layer contains at least one compound selected from the group consisting of $Nb_2O_5$, $Y_2O_3$ and $CeO_2$.

6. The separator for a nonaqueous electrolyte secondary battery according to claim 1, wherein the second coat layer contains $Nb_2O_5$.

7. The separator for a nonaqueous electrolyte secondary battery according to claim 1, which is used for a lithium ion secondary battery.

* * * * *